US010176062B2

(12) United States Patent
Li et al.

(10) Patent No.: US 10,176,062 B2
(45) Date of Patent: Jan. 8, 2019

(54) CLOUD SERVERS AND METHODS FOR HANDLING DYSFUNCTIONAL CLOUD SERVICES

(71) Applicant: Quanta Computer Inc., Taoyuan (TW)

(72) Inventors: Meng-Yu Li, Taoyuan (TW); Chun-Hung Chen, Taoyuan (TW); Chia-Chen Chiang, Taoyuan (TW); Chen-Chung Lee, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 119 days.

(21) Appl. No.: 15/607,963

(22) Filed: May 30, 2017

(65) Prior Publication Data
US 2018/0196724 A1 Jul. 12, 2018

(30) Foreign Application Priority Data

Jan. 10, 2017 (TW) .............................. 106100683 A (51) Int. Cl.
*G06F 11/20* (2006.01)
*G06F 9/50* (2006.01)

(52) U.S. Cl.
CPC .......... *G06F 11/203* (2013.01); *G06F 9/5027* (2013.01)

(58) Field of Classification Search
CPC ...... G06F 9/5027; G06F 9/505; G06F 9/5088; G06F 11/203
See application file for complete search history.

(56) References Cited

U.S. PATENT DOCUMENTS 8,156,179 B2 * 4/2012 Parmar ................. G06F 9/5038
370/389
8,341,462 B2 * 12/2012 Broda ................... G06F 9/5083
714/25
(Continued)

FOREIGN PATENT DOCUMENTS

CN 1776643 A 5/2006
CN 102164169 A 11/2013
(Continued)

OTHER PUBLICATIONS

Chinese language office action dated Nov. 17, 2017, issued in application No. TW 106100683.

*Primary Examiner* — Joseph R Kudirka
(74) *Attorney, Agent, or Firm* — McClure, Qualey & Rodack, LLP (57) ABSTRACT

A cloud server including a communication device, a plurality of hardware resources, and a controller is provided. The communication device provides a network connection to the Internet and an electronic computing device on the Internet. A respective virtual machine is instantiated for service execution on each of the hardware resources. The controller receives a hosting request for a service from the electronic computing device via the communication device, allocates one of the hardware resources to execute the service according to the hosting request and determine a link for accessing the service from outside of the cloud server in response to the hosting request, tests whether the service is functional by accessing the service from the Internet according to the link via the communication device, and transfers the service to be executed by another one of the hardware resources when the service is dysfunctional.

15 Claims, 5 Drawing Sheets

(56) References Cited

U.S. PATENT DOCUMENTS

| | | | |
|---|---|---|---|
| 8,970,876 B2 | 3/2015 | Takahashi et al. | |
| 9,785,544 B2 | 10/2017 | Tan et al. | |
| 2015/0244640 A1* | 8/2015 | Ponsford | H04L 47/70 709/226 |
| 2016/0036924 A1* | 2/2016 | Koppolu | H04L 67/16 709/224 |

FOREIGN PATENT DOCUMENTS

| | | |
|---|---|---|
| CN | 105446872 A | 3/2016 |
| TW | 20118741 A1 | 6/2011 |

\* cited by examiner

CLOUD SERVERS AND METHODS FOR HANDLING DYSFUNCTIONAL CLOUD SERVICES

CROSS REFERENCE TO RELATED APPLICATIONS

This Application claims priority of Taiwan Application No. 106100683, filed on Jan. 10, 2017, and the entirety of which is incorporated by reference herein.

BACKGROUND OF THE APPLICATION

Field of the Application

The application relates generally to cloud service technologies, and more particularly, to methods and cloud servers for handling dysfunctional cloud services.

Description of the Related Art

With the rapid development of networking technologies, the concept of cloud computing has been proposed and realized by using ubiquitous networks to integrate distributed computing devices on the Internet to provide various resources and services. For example, a user may operate on a desktop computer, a notebook Personal Computer (PC), a panel PC, a smartphone, or any computing device with wired/wireless communication function, to access e-mails maintained in a remote server, or to send a data processing task to be carried out by a remote server. In addition, with network connections, a remote server may serve as a cloud server to provide functions of data backup and access, and/or cloud computing.

Cloud computing technologies are used as an example. In a typical cloud environment, it is up to the cloud server to maintain the functioning of services once they are uploaded to the cloud server by service providers or application developers. Generally, a cloud server may host multiple services simultaneously, and it may include a plurality of computing hosts which are maintained in a complicated networking architecture. Once a service dysfunction occurs, it is hard to locate the problem. Conventionally, manual inspection is used to solve the problem. However, manual inspection is inefficient in terms of time and cost. Therefore, it is desirable to have a more intelligent and robust way of handling dysfunctional services, so as to provide a stable platform for cloud services.

BRIEF SUMMARY OF THE APPLICATION

In order to solve the aforementioned problem, the present application proposes to run an automatic inspection for service dysfunctions and transfer the dysfunctional service to a different computing host, thereby improving cloud service stability.

In one aspect of the application, a cloud server comprising a communication device, a plurality of hardware resources, and a controller is provided. The communication device is configured to provide a network connection to the Internet and an electronic computing device on the Internet. A respective virtual machine is instantiated for service execution on each of the hardware resources. The controller is configured to receive a hosting request for a service from the electronic computing device via the communication device, allocate one of the hardware resources to execute the service according to the hosting request and determine a link for accessing the service from outside of the cloud server in response to the hosting request, test whether the service is functional by accessing the service from the Internet according to the link via the communication device, and transfer the service to be executed by another one of the hardware resources when the service is dysfunctional.

The controller is further configured to perform said test periodically, and said transfer is performed when said test has been performed a predetermined number of times and results of the tests all indicate that the service is dysfunctional.

Alternatively, the controller is further configured to send the link to the electronic computing device via the communication device when the service is functional.

In one embodiment, the hosting request comprises a predetermined initial value and a verification value, and the controller is further configured to input the predetermined initial value to the service to generate an output value, and determine that the service is functional when the output value equals the verification value. The hosting request comprises a service type indicating that the service is a Web Application Programming Interface (Web API), a web site, or a data processing task. The link comprises a Uniform Resource Locator (URL). Each of the hardware resources comprises a computing host.

In another aspect of the application, a method for a cloud server to handle a dysfunctional service is provided. The method comprises the steps of: receiving a hosting request for a service from an electronic computing device on the Internet; in response to the hosting request, allocating one of a plurality of hardware resources to execute the service according to the hosting request and determining a link for accessing the service from outside of the cloud server, wherein a respective virtual machine is instantiated for service execution on each of the hardware resources; testing whether the service is functional by accessing the service from the Internet according to the link; and transferring the service to be executed by another one of the hardware resources when the service is dysfunctional.

The method further comprises the step of: performing said test periodically, wherein said transfer is performed when said test has been performed a predetermined number of times and results of the tests all indicate that the service is dysfunctional.

Alternatively, the method further comprises the step of: sending the link to the electronic computing device when the service is functional.

In one embodiment, the hosting request comprises a predetermined initial value and a verification value, and the method further comprises the step of: inputting the predetermined initial value to the service to generate an output value; and determining that the service is functional when the output value equals the verification value. The hosting request comprises a service type indicating that the service is a Web Application Programming Interface (Web API), a web site, or a data processing task. The link comprises a Uniform Resource Locator (URL). Each of the hardware resources comprises a computing host.

In yet another aspect of the application, a non-transitory computer readable storage medium comprising instructions is provided. The instructions, when executed by a controller of a cloud server, enable the controller to: receive a hosting request for a service from an electronic computing device on the Internet; in response to the hosting request, allocate one of a plurality of hardware resources in the cloud server to execute the service according to the hosting request and determine a link for accessing the service from outside of the cloud server, wherein a respective virtual machine is instantiated for service execution on each of the hardware resources; test whether the service is functional by accessing the service from the Internet according to the link; and transfer the service to be executed by another one of the hardware resources when the service is dysfunctional.

Other aspects and features of the application will become apparent to those with ordinary skill in the art upon review of the following descriptions of specific embodiments of the cloud servers and methods for handling a dysfunctional service.

BRIEF DESCRIPTION OF THE DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof.

Figure 1:
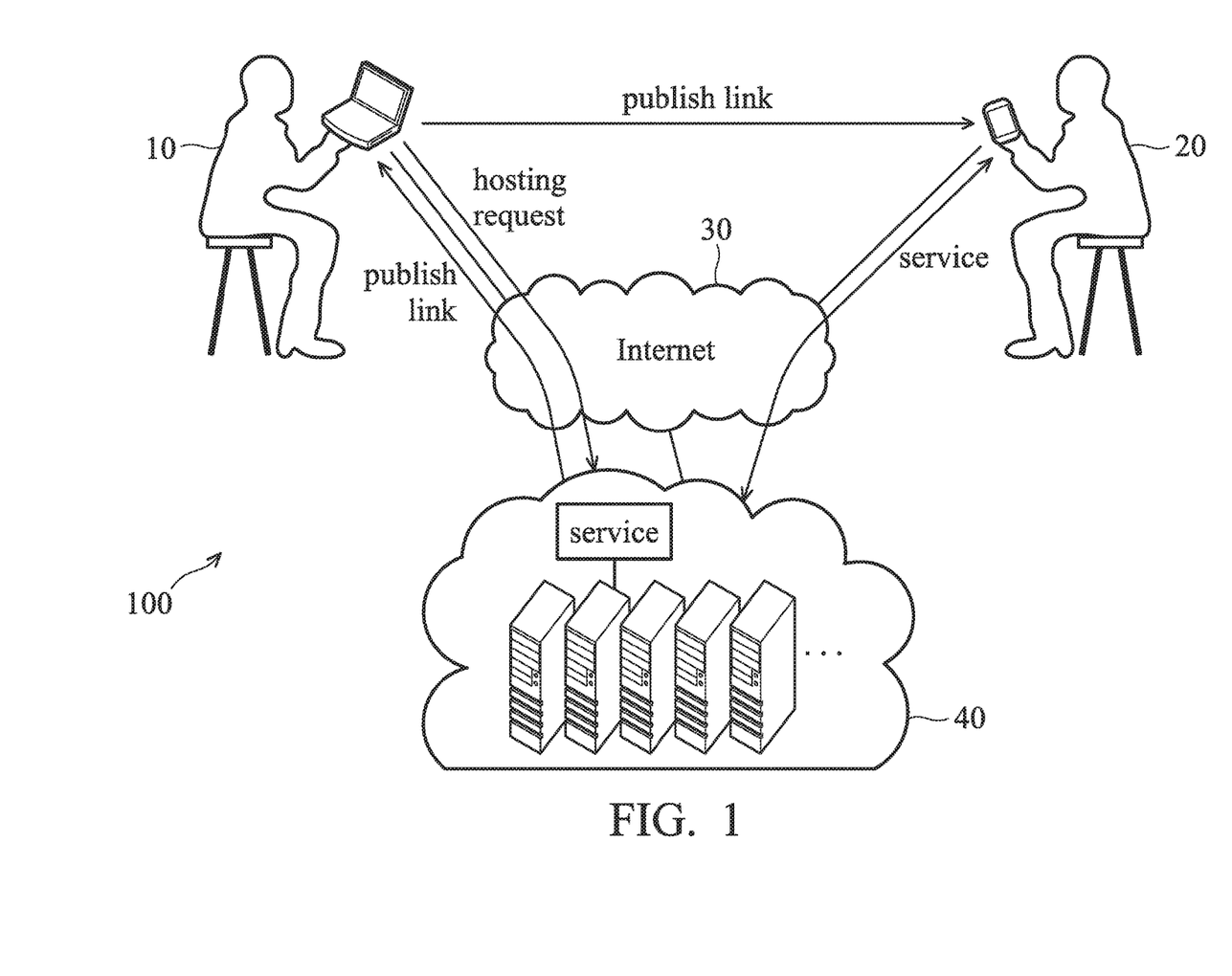
FIG. 1 is a schematic diagram illustrating a cloud computing environment according to an embodiment of the application.

FIG. 1 is a schematic diagram illustrating a cloud computing environment according to an embodiment of the application. The cloud computing environment 100 includes an electronic computing device 10 of a service provider, an electronic computing device 20 of a user, the Internet 30, and a cloud server 40, wherein the electronic computing devices 10 and 20 may connect to the cloud server 40 through the Internet 30. For example, each of the electronic computing devices 10 and 20 may be a computing device with a wired/wireless communication function, such as a notebook PC, a desktop computer, a smartphone, or a Panel PC, etc.

Specifically, the service provider may operate on the electronic computing device 10 to upload program code of a service to the cloud server 40 and to request the cloud server 40 to host the service. The type of service may be a Web Application Programming Interface (Web API), a web site, or a data processing task (involving, for example, electronic spreadsheets or orders).

When receiving the hosting request, the cloud server 40 performs service deployment. That is, the cloud server 40 allocates a hardware resource to execute the service according to the service type, and determines a link for accessing the service from outside of the cloud server 40. In addition, the cloud server 40 sends the link to the electronic computing device 10.

Subsequently, the service provider may operate on the electronic computing device 10 to send the link to the user and the electronic computing device 20, so that the user may use the link to access the service executed by the cloud server 40.

Please note that, in addition to the service deployment, the cloud server 40 also tests whether the execution of each service is functional, and transfers the service to be executed by another hardware resource when the execution of the service is dysfunctional, thereby maintaining stability of the service execution.

Figure 2:
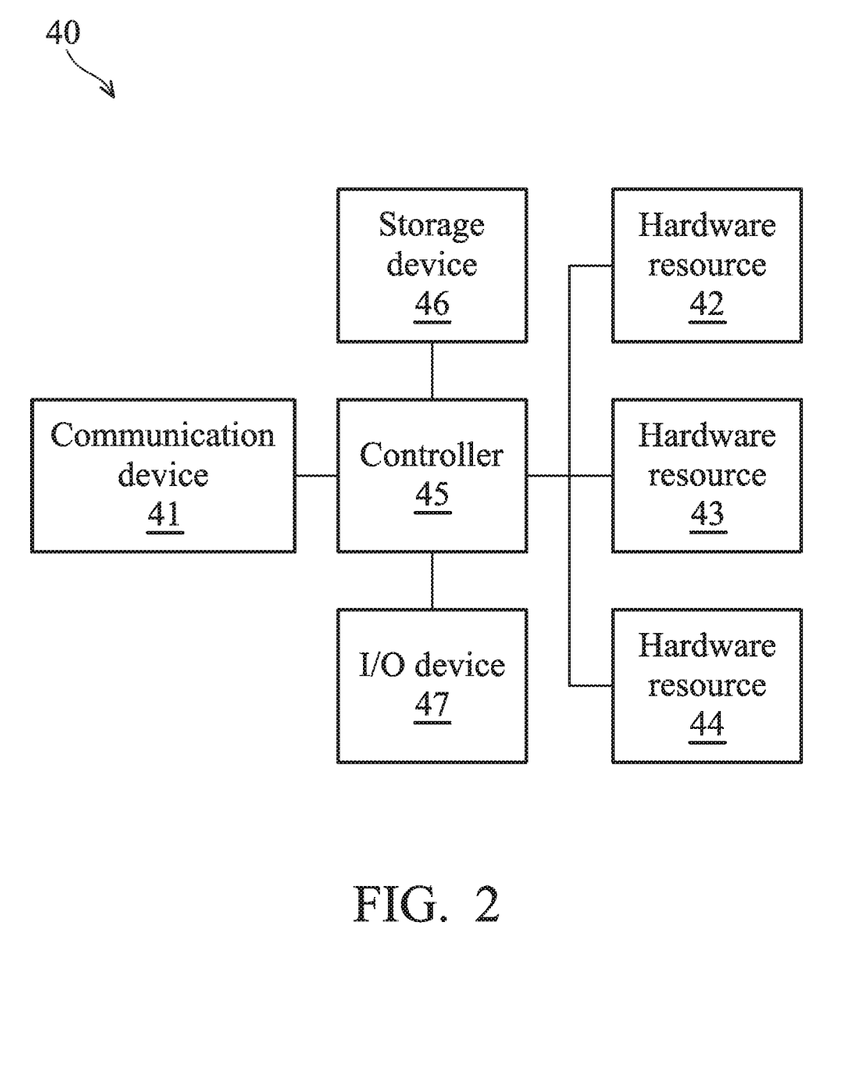
FIG. 2 is a block diagram illustrating the hardware architecture of the cloud server 40 according to an embodiment of the application.

FIG. 2 is a block diagram illustrating the hardware architecture of the cloud server 40 according to an embodiment of the application. The cloud server 40 includes a communication device 41, a plurality of hardware resources 42 to 44, a controller 45, a storage device 46, and an Input/Output (I/O) device 47.

The communication device 41 is responsible for providing a network connection to the Internet 30 and the electronic computing devices 10 and 20. The communication device 41 may provide the network connection using a wired/wireless communication technology, such as the Ethernet, Wireless Fidelity (Wi-Fi), Worldwide Interoperability for Microwave Access (WiMAX), Global System for Mobile communications (GSM), Wideband Code Division Multiple Access (WCDMA), or Long Term Evolution (LTE) technology.

Each of the hardware resources 42 to 44 may be a computing host on which a respective virtual machine is instantiated for service execution. For example, the computing host may be a workstation which at least includes the basic components for data processing and computing, such as a processor, a memory, and/or a hard drive.

The controller 45 may be a general-purpose processor, a Micro Control Unit (MCU), an Application Processor (AP), or a Digital Signal Processor (DSP), which includes various circuits for performing the functions of data processing and computing, controlling the communication device 41 to provide the network connection, managing the allocation of the hardware resources 42 to 44 for service execution, reading or storing data from or to the storage device 46, and receiving user inputs or outputting signals via the I/O device 47. In particular, the controller 45 coordinates the operations of the communication device 41, the hardware resources 42 to 44, the storage device 46, and the I/O device 47, to carry out the method for handling dysfunctional cloud services.

As will be appreciated by persons skilled in the art, the circuits in the controller 45 will typically include transistors that are configured in such a way as to control the operation of the circuitry in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in design of electronic and digital systems.

The storage device 46 is a non-transitory machine-readable storage medium, such as a Random Access Memory (RAM), or a FLASH memory, or a magnetic storage device, such as a hard disk or a magnetic tape, or an optical disc, or any combination thereof for storing instructions or program code of applications and/or communication protocols. In addition, the storage device 46 stores instructions or program code of the method of the present application.

The I/O device 47 may include one or more buttons, a keyboard, a mouse, a touch pad, a video camera, a microphone, a display device (e.g., a Liquid-Crystal Display (LCD), Light-Emitting Diode (LED) display, or Electronic Paper Display (EPD), etc.), and/or a speaker, etc., serving as the Man-Machine Interface (MMI) for interaction with users.

It should be understood that the components described in the embodiment of FIG. 2 are for illustrative purposes only and are not intended to limit the scope of the application. For example, the cloud server 40 may further include a power supply, and/or a Global Positioning System (GPS) device.

Figure 3:
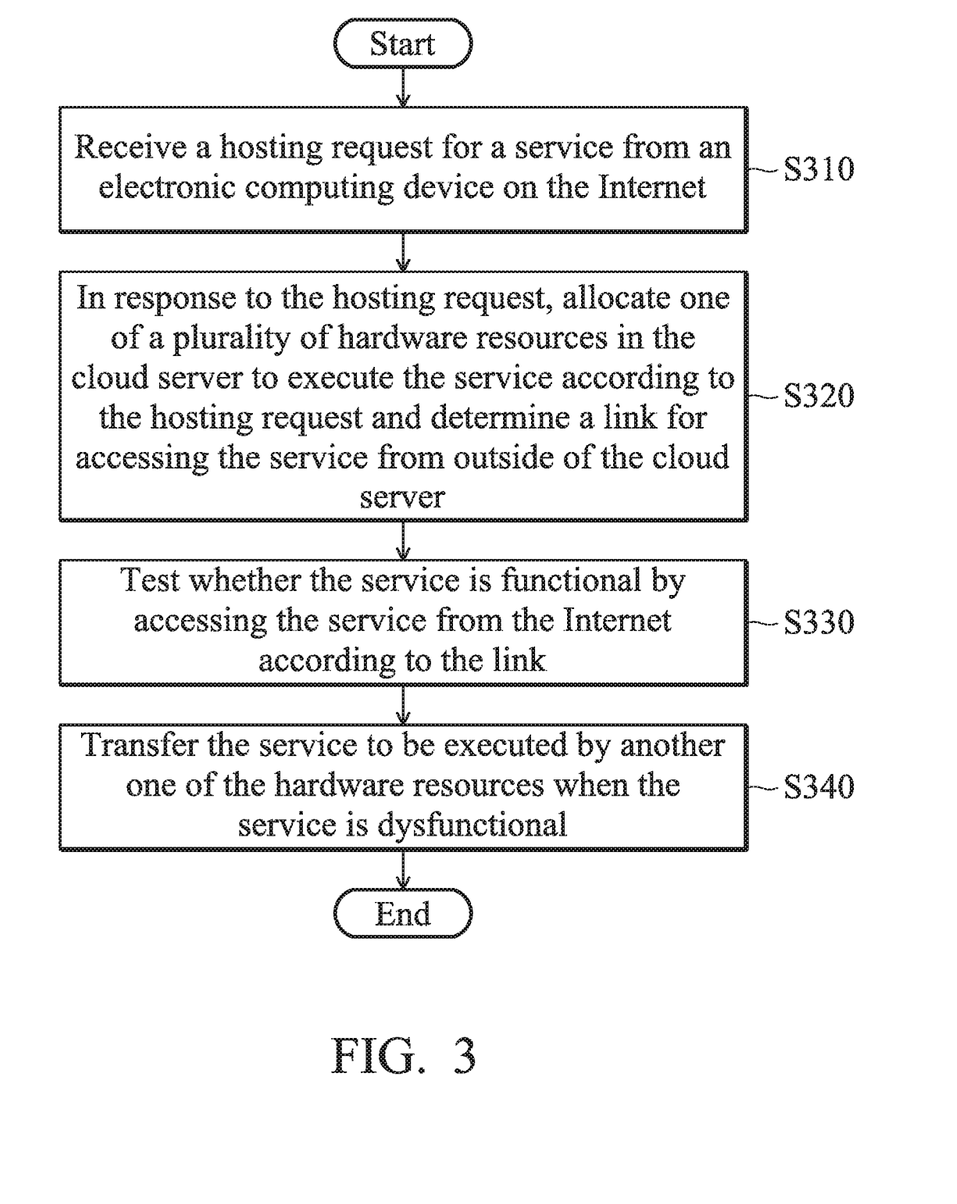
FIG. 3 is a flow chart of the method for handling a dysfunctional service according to an embodiment of the application.

FIG. 3 is a flow chart of the method for handling a dysfunctional service according to an embodiment of the application. In this embodiment, the method is applied to a cloud server which is connected to the Internet, such as the cloud server 40.

To begin, the cloud server receives a hosting request for a service from an electronic computing device on the Internet (step S310). The hosting request may include a service type, a predetermined initial value, and a verification value. The service type indicates the type of service, such as a Web Application Programming Interface (Web API), a web site, or a data processing task (involving, for example, electronic spreadsheets or orders). The predetermined initial value and the verification value are used as parameters for testing whether the service is functional.

In response to the hosting request, the cloud server allocates one of a plurality of hardware resources to execute the service according to the hosting request, and determines a link for accessing the service from outside of the cloud server (step S320). In one embodiment, each of the hardware resources may be a computing host, e.g., a computer. The allocation may be performed according to the type of service, the system loading of each of the hardware resources, and/or whether each of the hardware resources has executed the service before and the service was dysfunctional then.

Next, the cloud server tests whether the execution of the service is functional by accessing the service from the Internet according to the link (step S330). In one embodiment, the cloud server may input the predetermined initial value, which is obtained from the hosting request, to the executing service to generate an output value. If the output value equals the verification value which is obtained from the hosting request, the service is determined to be functional. Otherwise, if the output value is not equal to the verification value, the service is determined to be dysfunctional.

After that, the cloud server transfers the dysfunctional server to be executed by another hardware resource (step S340), and the method ends.

Figure 4A:
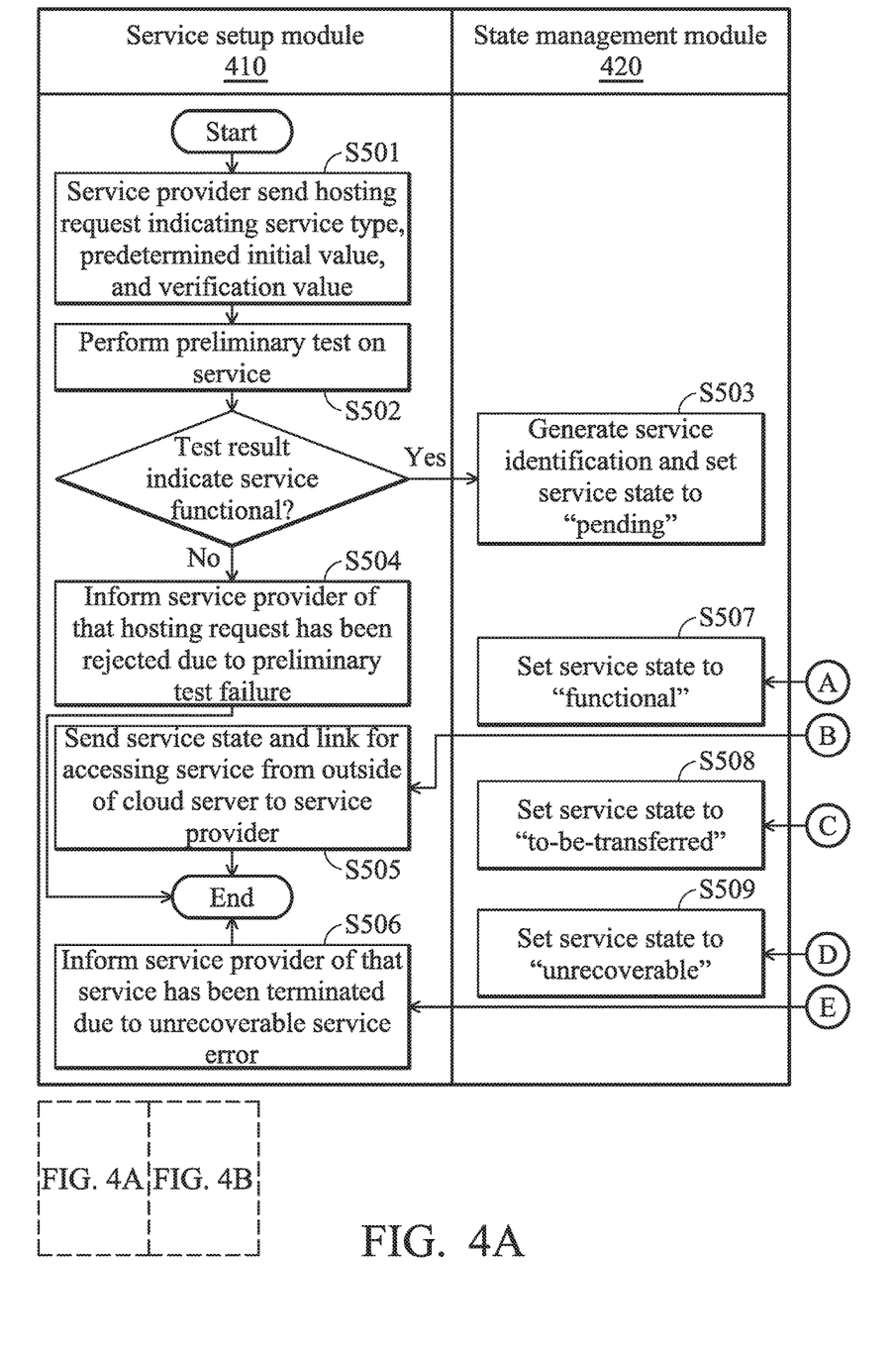
FIGS. 4A and 4B show a software implementation view of handling a dysfunctional service according to an embodiment of the application.
Figure 4B:
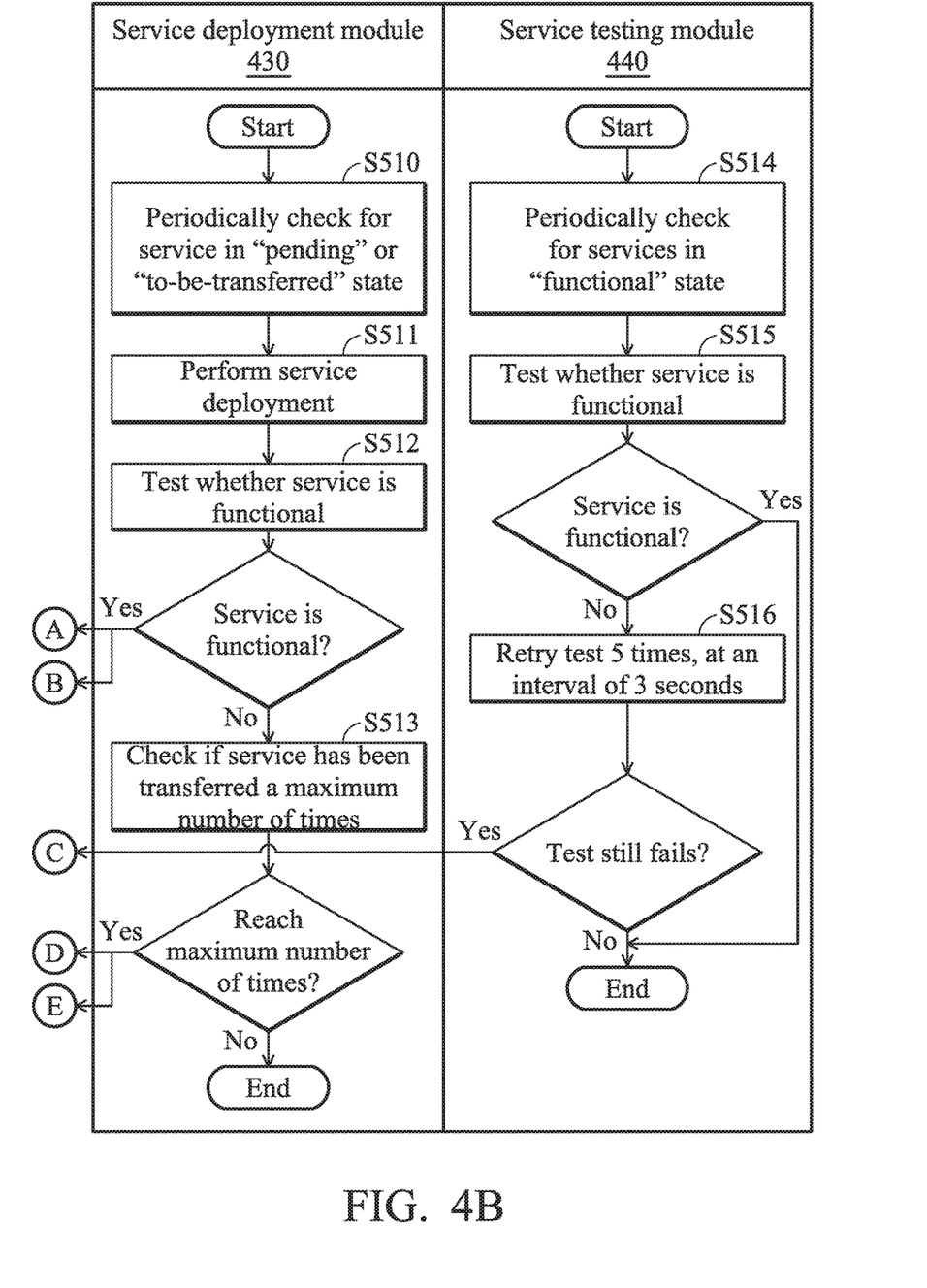

FIGS. 4A and 4B show a software implementation view of handling a dysfunctional service according to an embodiment of the application. In this embodiment, the software architecture includes a service setup module 410, a state management module 420, a service deployment module 430, and a service testing module 440. The software modules may be realized in program code which, when executed by a processor or controller of a cloud server, enables the processor/controller to perform the method for handling dysfunctional services.

Firstly, the service setup module 410 is responsible for providing an entry for electronic computing devices outside the cloud server to access the cloud server.

Through this entry, a service provider may send a hosting request for a service to the cloud server, which includes a service type, a predetermined initial value, and a verification value (step S501). The service setup module 410 performs a preliminary test on the service according to the predetermined initial value and the verification value (step S502). If the result of the preliminary test indicates that the service is functional, the service setup module 410 generates an identification of the service and informs the state management module 420 to set the state of the service to "pending" (step S503). Otherwise, if the result of the preliminary test indicates that the service is dysfunctional, the service setup module 410 informs the service provider that the hosting request has been rejected due to failure of the preliminary test (step S504).

In addition, the service setup module 410 sends the state of the service and the link for accessing the service from outside of the cloud server to the service provider, when deployment of the service is completed (step S505). Also, when there is a service which cannot be recovered from being dysfunctional to being functional by transferring it to a different hardware resource, the service setup module 410 informs the service provider that the service has been terminated due to unrecoverable error of the service (step S506).

Secondly, the state management module 420 is responsible for maintaining the states of the services hosted by the cloud server, and storing information of the services, such as the service information maintained for the service setup module 410, the identifications of the services (for identifying the services in the cloud server), the paths of the services within the cloud server, and the links for accessing the services from outside of the cloud server.

Specifically, when a new service passes the preliminary test, the state management module 420 generates an identification for the new service, which is used for identifying the service in the cloud server, stores the service information maintained for the service setup module 410, and sets the state of the service to "pending" (step S503).

In addition, when deployment of the service is completed, the state management module 420 sets the state of the service to "functional" (step S507). When there's a service determined to be dysfunctional by the service testing module 440, the state management module 420 sets the state of the service to "to-be-transferred" (step S508). When there's a service which cannot be recovered from being dysfunctional to being functional by the transfer operation, the state management module 420 sets the state of the service to "unrecoverable" (step S509).

Thirdly, the service deployment module 430 is responsible for deploying the services.

Specifically, the service deployment module 430 periodically checks if there's any service in the "pending" or "to-be-transferred" state (step S510), and if so, performs deployment of the service (step S511). Generally, a cloud server may include a plurality of hardware resources, such as computing hosts. The service deployment module 430 may allocate one of the multiple hardware resources to execute the service according to the following factors: the type of service, the system loading of each of the hardware resources, and/or whether each of the hardware resources has executed the service before and the service was dysfunctional then.

Using a service in the "pending" state as an example, the number of executing services in each of the hardware resources may be used as a reference to determine the deployment of the service. As to a service in the "to-be-transferred" state, the last hardware resource by which the service was executed may be excluded during the deployment (which may be referred to as "re-deployment") of the service since the service was dysfunctional when executed by this hardware resource.

When deployment of the service is completed, the service deployment module 430 tests whether the service is functional by accessing the service from the Internet according to the link (step S512). If the test result indicates that the service is functional, the service deployment module 430 informs the state management module 420 to set the state of the service to "functional" (step S507), and sends the state of the service and the link for accessing the service from outside of the cloud server to the service provider via the service setup module 410 (step S505).

Otherwise, if the test result indicates that the service is dysfunctional, the service deployment module 430 determines whether the service has been transferred a predetermined number of times, i.e., the limit for the number of transfers for a service (step S513). If the number of transfers for the service has reached the limit, the service deployment module 430 informs the state management module 420 to set the state of the service to "unrecoverable" (step S509), and informs the service provider, via the service setup module 410, that the service has been terminated due to unrecoverable error of the service (step S506).

For example, the limit for the number of transfers for a service may be the total number of hardware resources. That is, when every hardware resource has executed the same service and the service is always dysfunctional, it is determined that the number of transfers of the service has reached the maximum limit.

Fourthly, the service testing module 440 is responsible for testing whether the services in the "functional" state are still functional.

Specifically, the service testing module 440 periodically checks (e.g., every minute) if there's any service in the "functional" state (step S514), and runs a test on each of the services in the "functional" state (step S515). The test is basically designed to simulate a real user accessing the service, i.e., accessing the service from the Internet to the cloud server according to the link published to the service provider.

In addition, the test is carried out by inputting the predetermined initial value to the service to generate an output value, and if the output value is not equal to the verification value, the test is retried every 3 seconds (step S516). If the test has been retried 5 times and still fails, the service testing module 440 informs the state management module 420 to set the state of the service to "to-be-transferred" (step S508).

In view of the embodiments of FIGS. 3, 4A, and 4B, it will be appreciated that the method of the present application is characterized by accessing the cloud service from the Internet to test the service according to the published link. Advantageously, a more accurate service test is provided before releasing the cloud service, and this improves the stability of the cloud service. Moreover, the method of the present application is also characterized by allowing the service test to be retried 5 times (at an interval of several seconds) before determining that the service is dysfunctional. Advantageously, frequent service transfers due to a temporary system error may be avoided.

While the application has been described by way of example and in terms of preferred embodiment, it should be understood that the application cannot be limited thereto. Those who are skilled in this technology can still make various alterations and modifications without departing from the scope and spirit of this application. Therefore, the scope of the present application shall be defined and protected by the following claims and their equivalents.

What is claimed is:

1. A cloud server, comprising:
   a communication device, configured to provide a network connection to the Internet and an electronic computing device on the Internet;
   a plurality of hardware resources, wherein a respective virtual machine is instantiated for service execution on each of the hardware resources; and
   a controller, configured to receive a hosting request for a service from the electronic computing device via the communication device, allocate one of the hardware resources to execute the service according to the hosting request and determine a link for accessing the service from outside of the cloud server in response to the hosting request, test whether the service is functional by accessing the service from the Internet according to the link via the communication device, and transfer the service to be executed by another one of the hardware resources when the service is dysfunctional.

2. The cloud server as claimed in claim 1, wherein the controller is further configured to perform said test periodically, and said transfer is performed when said test has been performed a predetermined number of times and results of the tests all indicate that the service is dysfunctional.

3. The cloud server as claimed in claim 1, wherein the controller is further configured to send the link to the electronic computing device via the communication device when the service is functional.

4. The cloud server as claimed in claim 1, wherein the hosting request comprises a predetermined initial value and a verification value, and the controller is further configured to input the predetermined initial value to the service to generate an output value, and determine that the service is functional when the output value equals the verification value.

5. The cloud server as claimed in claim 1, wherein the hosting request comprises a service type indicating that the service is a Web Application Programming Interface (Web API), a web site, or a data processing task.

6. The cloud server as claimed in claim 1, wherein the link comprises a Uniform Resource Locator (URL).

7. The cloud server as claimed in claim 1, wherein each of the hardware resources comprises a computing host.

8. A method for a cloud server to handle a dysfunctional service, comprising:
   receiving a hosting request for a service from an electronic computing device on the Internet;
   in response to the hosting request, allocating one of a plurality of hardware resources to execute the service according to the hosting request and determining a link for accessing the service from outside of the cloud server, wherein a respective virtual machine is instantiated for service execution on each of the hardware resources;
   testing whether the service is functional by accessing the service from the Internet according to the link; and
   transferring the service to be executed by another one of the hardware resources when the service is dysfunctional.

9. The method as claimed in claim 8, further comprising:
   performing said test periodically, wherein said transfer is performed when said test has been performed a predetermined number of times and results of the tests all indicate that the service is dysfunctional.

10. The method as claimed in claim 8, further comprising:
sending the link to the electronic computing device when the service is functional.

11. The method as claimed in claim 8, wherein the hosting request comprises a predetermined initial value and a verification value, and the method further comprises:
inputting the predetermined initial value to the service to generate an output value; and
determining that the service is functional when the output value equals the verification value.

12. The method as claimed in claim 8, wherein the hosting request comprises a service type indicating that the service is a Web Application Programming Interface (Web API), a web site, or a data processing task.

13. The method as claimed in claim 8, wherein the link comprises a Uniform Resource Locator (URL).

14. The method as claimed in claim 8, wherein each of the hardware resources comprises a computing host.

15. A non-transitory computer readable storage medium comprising instructions which, when executed by a controller of a cloud server, enable the controller to:
receive a hosting request for a service from an electronic computing device on the Internet;
in response to the hosting request, allocate one of a plurality of hardware resources in the cloud server to execute the service according to the hosting request and determine a link for accessing the service from outside of the cloud server, wherein a respective virtual machine is instantiated for service execution on each of the hardware resources;
test whether the service is functional by accessing the service from the Internet according to the link; and
transfer the service to be executed by another one of the hardware resources when the service is dysfunctional.

* * * * *